United States Patent
Le Floch et al.

(10) Patent No.: US 8,897,364 B2
(45) Date of Patent: Nov. 25, 2014

(54) METHOD AND DEVICE FOR SEQUENCE DECODING WITH ERROR CONCEALMENT

(75) Inventors: Hervé Le Floch, Rennes (FR); Cédric Riou, St Jacques de la Lande (FR)

(73) Assignee: Canon Kabushiki Kaisha, Tokyo (JP)

( * ) Notice: Subject to any disclaimer, the term of this patent is extended or adjusted under 35 U.S.C. 154(b) by 477 days.

(21) Appl. No.: 12/675,293

(22) PCT Filed: Aug. 29, 2008

(86) PCT No.: PCT/EP2008/007088
§ 371 (c)(1),
(2), (4) Date: May 5, 2010

(87) PCT Pub. No.: WO2009/027094
PCT Pub. Date: Mar. 5, 2009

(65) Prior Publication Data
US 2010/0309982 A1    Dec. 9, 2010

(30) Foreign Application Priority Data
Aug. 31, 2007   (FR) ..................... 07 06133

(51) Int. Cl.
*H04N 7/12*    (2006.01)
(Continued)

(52) U.S. Cl.
CPC ... *H04N 19/00939* (2013.01); *H04N 19/00012* (2013.01); *H04N 19/00733* (2013.01); *H04N 19/00151* (2013.01); *H04N 19/00781* (2013.01); *H04N 19/00278* (2013.01)
USPC ................. 375/240.15; 375/240.27

(58) Field of Classification Search
None
See application file for complete search history.

(56) References Cited

U.S. PATENT DOCUMENTS

| 7,058,200 | B2 | 6/2006 | Donescu et al. | 382/100 |
| 7,478,241 | B2 | 1/2009 | Le Floch | 713/176 |

(Continued)

FOREIGN PATENT DOCUMENTS

| EP | 1 775 954 A1 | 4/2007 |
| WO | 01/39509 A1 | 5/2001 |

OTHER PUBLICATIONS

Lee et al., "A Temporal Error Concealment Method for MPEG Coded Video Using a Multi-Frame Boundary Matching Algorithm", Center of Signal and Image Processing, Georgia Institute of Technology, IEEE, 2001, pp. 990 to 993.

(Continued)

*Primary Examiner* — Anner Holder
*Assistant Examiner* — Mikhail Itskovich
(74) *Attorney, Agent, or Firm* — Fitzpatrick, Cella, Harper & Scinto

(57) ABSTRACT

The invention concerns a method for decoding a video sequence encoded according to a predictive format, which video sequence includes predicted images containing encoded residual data representing differences between the respective predicted image and a respective reference image in the video sequence. The method of the invention comprises, applying to a current image which contains at least one area which is to be reconstructed, the steps of:
  obtaining (E605) projected residual data for said at least one area to be reconstructed, from residual data of at least one image predicted from the current image, corresponding to a temporal projection of at least part of the at least one area to be reconstructed onto said at least one image predicted from the current image; and
  reconstructing (E606) at least part of said at least one area using the projected residual data obtained.

16 Claims, 11 Drawing Sheets

(51) Int. Cl.
*H04N 11/04* (2006.01)
*H04N 11/02* (2006.01)
*H04N 19/102* (2014.01)
*H04N 19/583* (2014.01)
*H04N 19/89* (2014.01)
*H04N 19/139* (2014.01)
*H04N 19/61* (2014.01)
*H04N 19/176* (2014.01)

(56) References Cited

U.S. PATENT DOCUMENTS

| | | | |
|---|---|---|---|
| 2006/0062304 A1* | 3/2006 | Hsia | 375/240.16 |
| 2006/0233258 A1* | 10/2006 | Holcomb | 375/240.21 |
| 2007/0195880 A1 | 8/2007 | Henocq et al. | 375/240.13 |
| 2008/0130739 A1 | 6/2008 | Le Floch et al. | 375/240.01 |
| 2008/0144725 A1 | 6/2008 | Henocq et al. | 375/240.27 |
| 2009/0041132 A1 | 2/2009 | Le Floch et al. | 375/240.26 |
| 2009/0254798 A1 | 10/2009 | Gisquet et al. | 714/819 |
| 2009/0262836 A1 | 10/2009 | Le Floch et al. | 375/240.26 |
| 2010/0128791 A1 | 5/2010 | Le Floch et al. | 375/240.16 |
| 2010/0303154 A1 | 12/2010 | Le Floch et al. | 375/240.16 |

OTHER PUBLICATIONS

"Information Technology—Coding of Audio-Visual Objects—Part 2: Visual, ISO/IEC 14496-2:2001", ISO/IEC JTC 1/SC 29/WG 11 N4350, Jul. 2001.

Demetri Terzopoulos, "Computing Visible-Surface Respresentations", Massachusets Institute of Technology Artifical Intelligence Laboratory, A.I. Memo No. 800, Mar. 1985.

Wang, Y., et al., "Error Control and Concealment for Video Communication: A Review", Proceedings of the IEEE, vol. 86, No. 5, pp. 985-990 (May 1, 1998).

Hsia, S., et al., "Efficient Adaptive Error Concealment Technique for Video Decoding System", IEEE Transactions on Multimedia, vol. 7, No. 5, pp. 860-868 (Oct. 1, 2005).

Criminisi, A, et al., "Object Removal by Exemplar-Based Inpainting", Proceedings of the 2003 IEEE Computer Society Conference on Computer Vision and Pattern Recognition (CVPR '03), 2003.

* cited by examiner

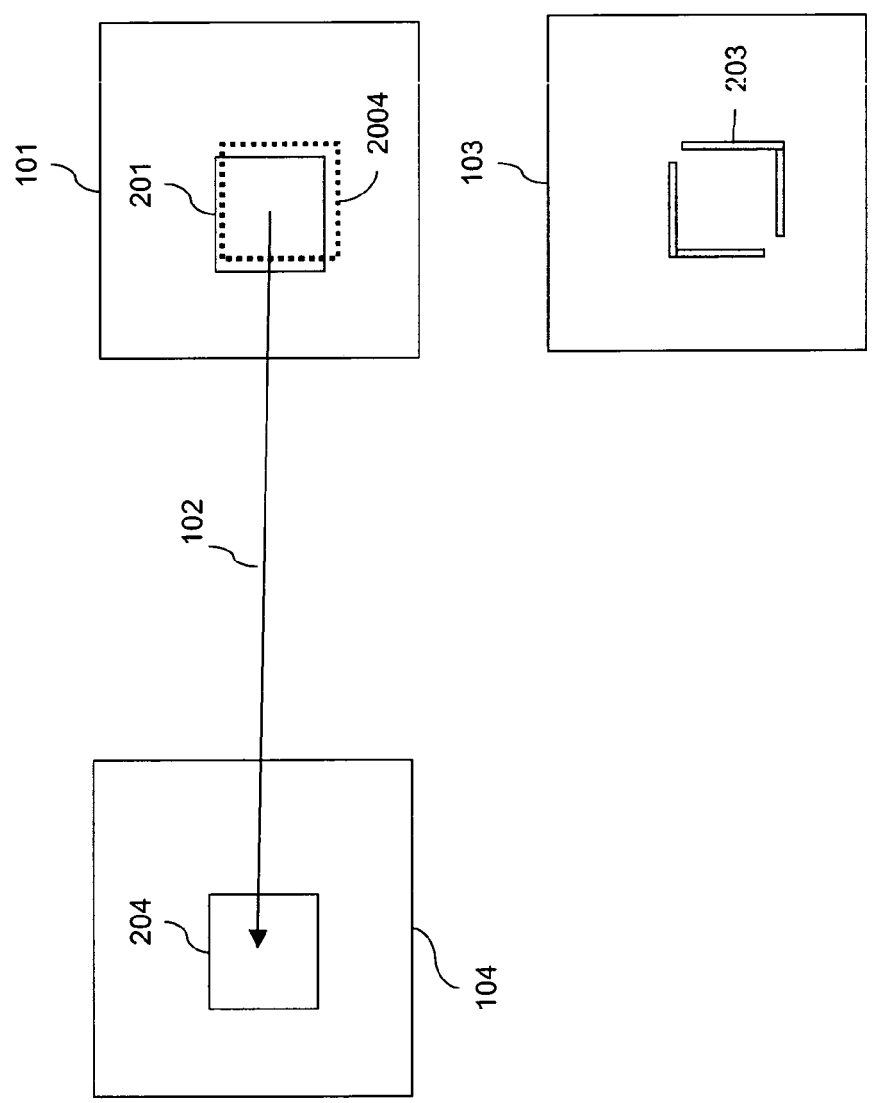

METHOD AND DEVICE FOR SEQUENCE DECODING WITH ERROR CONCEALMENT

BACKGROUND OF THE INVENTION

1. Field of the Invention

The invention concerns a method and device for video sequence decoding with error concealment.

The invention belongs to the domain of video processing in general and more particularly to the domain of decoding with error concealment after the loss or corruption of part of the video data, for example by transmission through an unreliable channel.

2. Description of the Prior-Art

Compressed video sequences are very sensitive to channel disturbances when they are transmitted through an unreliable environment such as a wireless channel. For example, in an IP/Ethernet network using the UDP transport protocol, there is no guarantee that the totality of data packets sent by a server is received by a client. Packet loss can occur at any position in a bitstream received by a client, even if mechanisms such as retransmission of some packets or redundant data (such as error correcting codes) are applied.

In case of unrecoverable error, it is known, in video processing, to apply error concealment methods, in order to partially recover the lost or corrupted data from the compressed data available at the decoder.

Most video compression methods, for example H.263, H.264, MPEG1, MPEG2, MPEG4, SVC, use block-based discrete cosine transform (DCT) and motion compensation to remove spatial and temporal redundancies. Each frame of the video sequence is divided into slices which are encoded and can be decoded independently. A slice is typically a rectangular portion of the image, or more generally, a portion of an image. Further, each slice is divided into macroblocks (MBs), and each macroblock is further divided into blocks, typically blocks of 8×8 pixels. The encoded frames are of two types: predicted frames (either predicted from one reference frame called P-frames or predicted from two reference frames called B-frames) and non predicted frames (called INTRA frames or I-frames).

For a predicted frame, the following steps are applied at the encoder:

motion estimation applied to each block of the considered predicted frame with respect to a reference frame, resulting in a motion vector per block pointing to a reference block of the reference frame. The set of motion vectors obtained by motion estimation form a so-called motion field.

prediction of the considered frame from the reference frame, where for each block, the difference signal between the block and its reference block pointed to by the motion vector is calculated. The difference signal, also known under the name of displaced frame difference, is called in the subsequent description residual signal or residual data. A DCT is then applied to each block of residual signal, and then, quantization is applied to the signal obtained after the DCT.

entropic encoding of the motion vectors and of the quantized transformed residual data signal.

For an INTRA encoded frame, the image is divided into blocks of pixels, a DCT is applied on each block, followed by quantization and the quantized DCT coefficients are encoded using an entropic encoder.

In practical applications, the encoded bitstream is either stored or transmitted through a communication channel.

At the decoder side, for the MPEG-type formats, the decoding achieves image reconstruction by applying the inverse operations with respect to the encoder. For all frames, entropic decoding and inverse quantization are applied.

For INTRA frames, the inverse quantization is followed by inverse block DCT, and the result is the reconstructed signal.

For predicted type frames, both the residual data and the motion vectors need to be decoded first. The residual data and the motion vectors may be encoded in separate packets in the case of data partitioning. For the residual signal, after inverse quantization, an inverse DCT is applied. Finally, for each predicted block, the signal resulting from the inverse DCT is added to the reconstructed signal of the block of the reference frame pointed out by the corresponding motion vector to obtain the final reconstructed image signal.

In case of loss or corruption of data packets of the bitstream, for example when the bitstream is transmitted though an unreliable transmission channel, it is known to apply error concealment methods at the decoder, in order to use the data correctly received to reconstruct the lost data.

The error concealment methods known in the prior art can be separated into two categories:
temporal error concealment methods, and
spatial error concealment methods.

Temporal error concealment methods reconstruct a field of motion vectors from the data available, and apply the reconstructed motion vector corresponding to a lost data block in a predicted frame to allow the prediction of the luminance of the lost data block from the luminance of the corresponding block in the reference frame. For example, if the motion vector for a current block in a current predicted image has been lost or corrupted, a motion vector can be computed from the motion vectors of the blocks located in the spatial neighborhood of the current block.

The temporal error concealment methods are efficient if there is sufficient correlation between the current decoded frame and the previous frame used as a reference frame for prediction. Therefore, temporal error concealment methods are preferably applied to entities of the predicted type (P frames or P slices), when there is no change of scene resulting in motion or luminance discontinuity between the considered predicted entities and the previous frame(s) which served as reference for the prediction.

Spatial error concealment methods use the data of the same frame to reconstruct the content of the lost data block(s).

In a prior-art rapid spatial error concealment method, the available data is decoded, and then the lost area is reconstructed by luminance interpolation from the decoded data in the spatial neighborhood of the lost area. Spatial error concealment is generally applied for image frames for which the motion or luminance correlation with the previous frame is low, for example in the case of scene change. The main drawback of classical rapid spatial interpolation is that the reconstructed areas are blurred, since the interpolation can be considered equivalent to a low-pass filtering of the image signal of the spatial neighborhood.

The article "Object removal by exemplar-based inpainting" by Criminisi et al, published in CVPR 2003 (IEEE Conference on Computer Vision and Pattern Recognition) describes a spatial error concealment method which better preserves the edges in an interpolated area by replicating available decoded data from the same frame to the lost or corrupted area, in function of a likelihood of resemblance criterion. The article describes an algorithm for removing large objects from a digital image, but it can also be applied as an error concealment method. The proposed algorithm replicates both texture and structure to fill-in the blank area, using propagation of already synthesized values of the same image, to fill the blank area progressively, the order of propagation being dependent on a confidence measure. The algorithm is complex and needs high computational capacities and a relatively long computational time. Moreover, the experiments show that in some cases, the reconstructed area is completely erroneous and shows false edges, which where not present in the initial image.

SUMMARY OF THE INVENTION

The present invention aims to alleviate the drawbacks of the prior art, by achieving better error concealment for unrecoverable data areas which have a low correlation or no correlation with data from previous frames, while having a low computational complexity.

To that end, the invention concerns a method for decoding a video sequence encoded according to a predictive format, which video sequence includes predicted images containing encoded residual data representing differences between the respective predicted image and a respective reference image in the video sequence, the method comprising, applying to a current image which contains at least one area which is to be reconstructed, the steps of:

obtaining projected residual data for said at least one area to be reconstructed, from residual data of at least one image predicted from the current image, corresponding to a temporal projection of at least part of the at least one area to be reconstructed onto said at least one image predicted from the current image; and reconstructing at least part of said at least one area using the projected residual data obtained.

The method of the invention achieves better error concealment by improving the quality of the reconstructed area with respect to edge information. Indeed, the residual data of the blocks predicted from the corrupted or lost area of the current image carries high frequency information, and in particular edge information.

The residual type data related to the area to be reconstructed, which has been either lost or corrupted, may be computed from the residual data related to blocks which have been predicted from the said area at the encoder side. The temporal correspondence, represented by the motion vectors is therefore exploited to recover residual data corresponding to the lost area and carrying information related to the high frequencies of the lost area.

In a particular embodiment, the method further comprises, before the step of obtaining projected residual data, a step of locating the at least one area to be reconstructed in the current image.

This step is preferably carried out in the decoder, based on information on lost or corrupted data packets in the bitstream.

In a particular embodiment, for each block of a predicted image, the step of obtaining projected residual data comprises the steps of:

obtaining a motion vector associated with said block;

applying at least a projection of the residual data associated with said block, according to said at least one motion vector, to obtain a projected residual data image corresponding temporally to an image which served as a reference image for predicting said predicted image.

According to a possible feature of this particular embodiment, the method further comprises a step of detecting an overlap area in the projected residual data image, said overlap area being an area to which several blocks of the predicted image are projected.

In a variant, after the detecting step, the method comprises a step of selecting to fill the overlap area, the residual data of the projected block having the highest energy.

In another variant, after the detecting step, a step of selecting, for the overlap area, the residual data of the last block projected onto the overlap area is executed.

These variants provide two alternatives for dealing with the case of a projection overlap area. The first variant provides a more accurate result than the second one, but is more costly in terms of computational operations.

According to a possible feature, a plurality of predicted images are used in the step of obtaining projected residual data.

Thus, the projected residual data obtained for the area to be reconstructed is more accurate and represents more high frequency information.

According to a particular embodiment, for at least one predicted image which is also a reference image for another image of the plurality of images, the step of obtaining projected residual data also comprises a sub-step of adding the residual data of said predicted image to the projected residual data image obtained by temporal projection (E507) for said predicted image as reference image.

This particular embodiment makes it possible to obtain projected residual data for a predicted image which is also a reference image in the encoding format, in a simple and systematic manner.

In an embodiment, in the reconstruction step, decoded data of the current image is also used.

This embodiment is particularly adapted to the spatial error concealment methods.

According to a particular embodiment, the decoded data being decoded values of the pixels of the current image, the reconstructing step implements a spatial interpolation algorithm from the decoded values of the pixels within a spatial neighborhood of the at least one area to be reconstructed.

In a first variant of this particular embodiment, for each pixel to be reconstructed of the at least one area to be reconstructed, the value of the projected residual data corresponding to said pixel to be reconstructed is added to the value obtained by spatial interpolation.

Thus, the quality of reconstruction is improved by the addition of projected residual data representative of high frequencies in the lost or corrupted area. The reconstructed area results less blurred than if only spatial interpolation is used.

In a second variant of this particular embodiment, the value attributed to a pixel to be reconstructed in the said at least one area to be reconstructed is calculated by a weighted sum of decoded values for pixels in the neighborhood, and each weighting factor depends on the projected residual data corresponding to said lost area.

According to a possible feature, the weighting factor associated with a pixel in the neighborhood is a function of the sum of absolute values of projected residual data of pixels situated on a line joining said pixel to be reconstructed and said pixel in the neighborhood. The weighting factor can be chosen inversely proportional to said sum.

Thus, the quality of reconstruction is improved by taking into account the residual data values in the interpolation, so as to attribute less weight to pixels that are located in an area separated from the pixel to be reconstructed by a line of high value residual data which can be assimilated to an edge.

According to a particular embodiment, the reconstructing step implements a spatial block matching error concealment method, the projected residual data obtained for said at least one area to be reconstructed being used to choose between a plurality of candidate blocks.

Thus, with respect to this embodiment also, the projected residual data, which carries edge information, improves the reconstruction quality of a block matching type reconstruction method, by helping to preserve the edge coherence in the reconstructed area.

The invention also concerns a device for decoding a video sequence encoded according to a predictive format, which video sequence includes predicted images containing encoded residual data representing differences between the respective predicted image and a respective reference image in the video sequence, the device comprising, applying to a current image which contains at least one area which is to be reconstructed:

means for obtaining projected residual data for at least one area to be reconstructed of a current image, from residual data of at least one image predicted from the current image, corresponding to a temporal projection of at least part of the at least one area to be reconstructed onto said at least one image predicted from said current image; and means for reconstructing at least part of said at least one area using the projected residual data obtained.

The invention also relates to carrier medium, such as an information storage means, that can be read by a computer or processor, storing instructions of a computer program for the implementation of the method for decoding a video sequence as briefly described above.

The invention also relates to a computer program which, when executed by a computer or a processor in a device for decoding a video sequence, causes the device to carry out a method as briefly described above.

The particular characteristics and advantages of the video sequence decoding device, of the storage means and of the computer program being similar to those of the video sequence decoding method, they are not repeated here.

BRIEF DESCRIPTION OF THE DRAWINGS

Other features and advantages will appear in the following description, which is given solely by way of non-limiting example and made with reference to the accompanying drawings, in which:

FIG. 2b is a schematic view of macroblock prediction and resulting residual data;

DETAILED DESCRIPTION OF THE EMBODIMENTS

Figure 1:
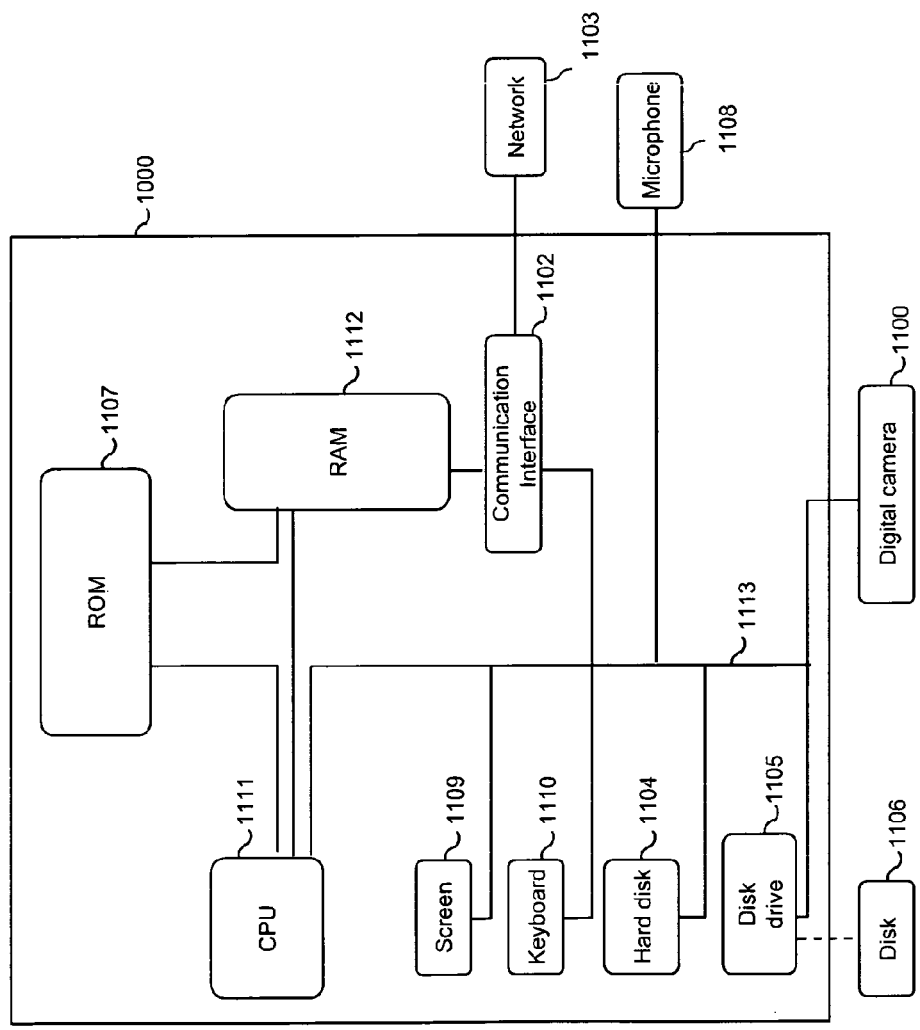
FIG. 1 is a diagram of a processing device adapted to implement the present invention.

FIG. 1 is a diagram of a processing device 1000 adapted to implement the present invention. The apparatus 1000 is for example a micro-computer, a workstation or a light portable device.

The apparatus 1000 comprises a communication bus 1113 to which there is connected:

a central processing unit 1111, such as a microprocessor, denoted CPU;

a read only memory 1107 able to contain computer programs for implementing the invention, denoted ROM;

a random access memory 1112, denoted RAM, able to contain the executable code of the method of the invention as well as the registers adapted to record variables and parameters necessary for implementing the invention; and a communication interface 1102 connected to a communication network 1103 over which digital data to be processed are transmitted.

Optionally, the apparatus 1000 may also have the following components, which are included in the embodiment shown in FIG. 1:

a data storage means 1104 such as a hard disk, able to contain the programs implementing the invention and data used or produced during the implementation of the invention;

a disk drive 1105 for a disk 1106, the disk drive being adapted to read data from the disk 1106 or to write data onto said disk;

a screen 1109 for displaying data and/or serving as a graphical interface with the user, by means of a keyboard 1110 or any other pointing means.

The apparatus 1000 can be connected to various peripherals, such as for example a digital camera 1100 or a microphone 1108, each being connected to an input/output card (not shown) so as to supply multimedia data to the apparatus 1000.

The communication bus 1113 affords communication and interoperability between the various elements included in the apparatus 1000 or connected to it. The representation of the bus is not limiting and in particular the central processing unit is able to communicate instructions to any element of the apparatus 1000 directly or by means of another element of the apparatus 1000.

The disk 1106 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of decoding a video sequence according to the invention to be implemented.

The executable code enabling the apparatus to implement the invention may be stored either in read only memory 1107, on the hard disk 1104 or on a removable digital medium such as for example a disk 1106 as described previously. According to a variant, the executable code of the programs can be received by means of the communication network, via the interface 1102, in order to be stored in one of the storage means of the apparatus 1000 before being executed, such as the hard disk 1104.

The central processing unit 1111 is adapted to control and direct the execution of the instructions or portions of software code of the program or programs according to the invention, instructions that are stored in one of the aforementioned storage means. On powering up, the program or programs that are stored in a non-volatile memory, for example on the hard disk 1104 or in the read only memory 1107, are transferred into the random access memory 1112, which then contains the executable code of the program or programs according to the invention, as well as registers for storing the variables and parameters necessary for implementing the invention.

It should be noted that the apparatus can also be a programmed apparatus. This apparatus then contains the code of the computer program or programs, for example fixed in an application specific integrated circuit (Application Specific Integrated Circuit or ASIC).

The invention may be applied to MPEG-type compression formats, such as H264, MPEG4 and SVC for example, and is based on the observation that residual data of predicted blocks carries edge information of the image areas represented by those blocks. In order to illustrate this concept, FIGS. 2a and 2b show a schematic example.

Figure 2A:
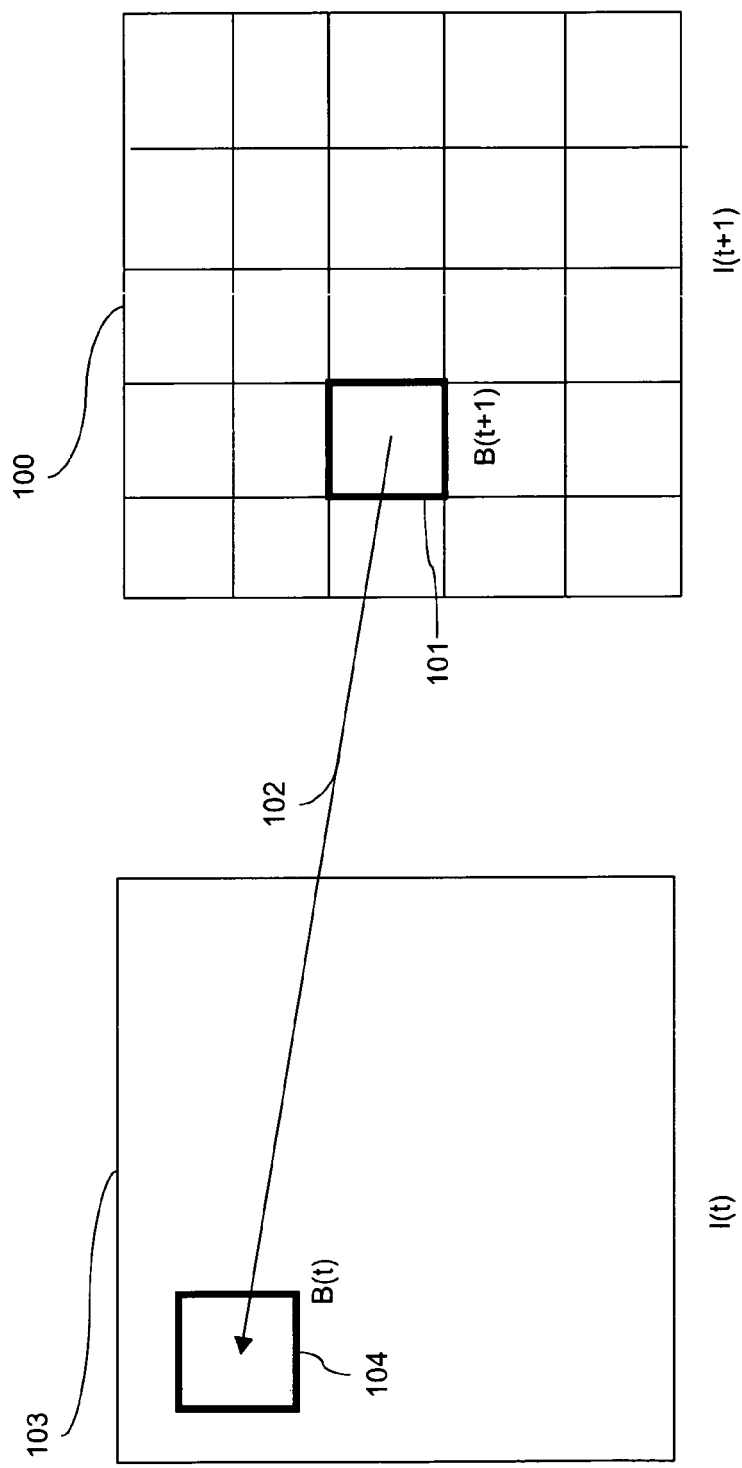
FIG. 2a is a schematic view of a predictive encoding structure.

FIG. 2a represents a schematic view of predictive encoding structure used in MPEG-type compression methods, as briefly described in the introduction.

FIG. 2a illustrates the case of a predicted frame I(t+1), predicted from a reference frame I(t).

Usually, in MPEG-type compression algorithms, the encoding unit is a macroblock, which is a group of blocks. In more general terms, the invention may be applied to image blocks.

The predicted image I(t+1) denoted 100 in the figure, is divided into blocks, and each block is encoded by prediction from a previous reference image I(t) denoted 103 in the figure. For example, for block 101, the motion vector 102 is calculated during the motion estimation step. The vector 102 points to the area 104 of the reference image I(t). At the encoding stage, in the prediction step, the pixel by pixel difference between the data of blocks 101 and 104 is calculated and forms the residual data. Next, the residual data is DCT transformed and quantized.

FIG. 2b represents an example of simple blocks 101 and 104, which are magnified in the figure. The purpose of FIG. 2b is to better illustrate the fact that within an encoding scheme of MPEG type, residual data carries edge information. Let us assume that the block to be predicted is block 101, which contains a gray square 201 on a white background area. According to the motion estimation, the block 101 is predicted from area 104 of the reference image, which also contains a gray square 204 on a white background. However, the position of the gray square 204, when projected via the motion vector 102 on the block 101, is slightly displaced, as illustrated by the dotted square 2004.

In practice, such an error can occur in particular because the underlying model of motion estimation and compensation as applying in video encoding is translational, but in reality, the motion in real videos may be more complex, including also slight rotations, therefore some estimation errors occur. In other practical cases, the error may occur because of the discretisation of the motion estimation to the pixel.

The prediction error is illustrated by block 103, in which the gray area 203 is the area where some prediction error has occurred. The area 203 is located at the edges of the square 201, where blocks 201 and the projection of block 204 do not coincide. The signal of block 103 is the residual data signal to be encoded in the bitstream according to the encoding format.

This schematic example illustrates the fact that the residual data carries edge information. The example chosen is simple and schematic, but it was verified by practical experiments on real examples of video data that the residual data carries edge information.

Figure 3:
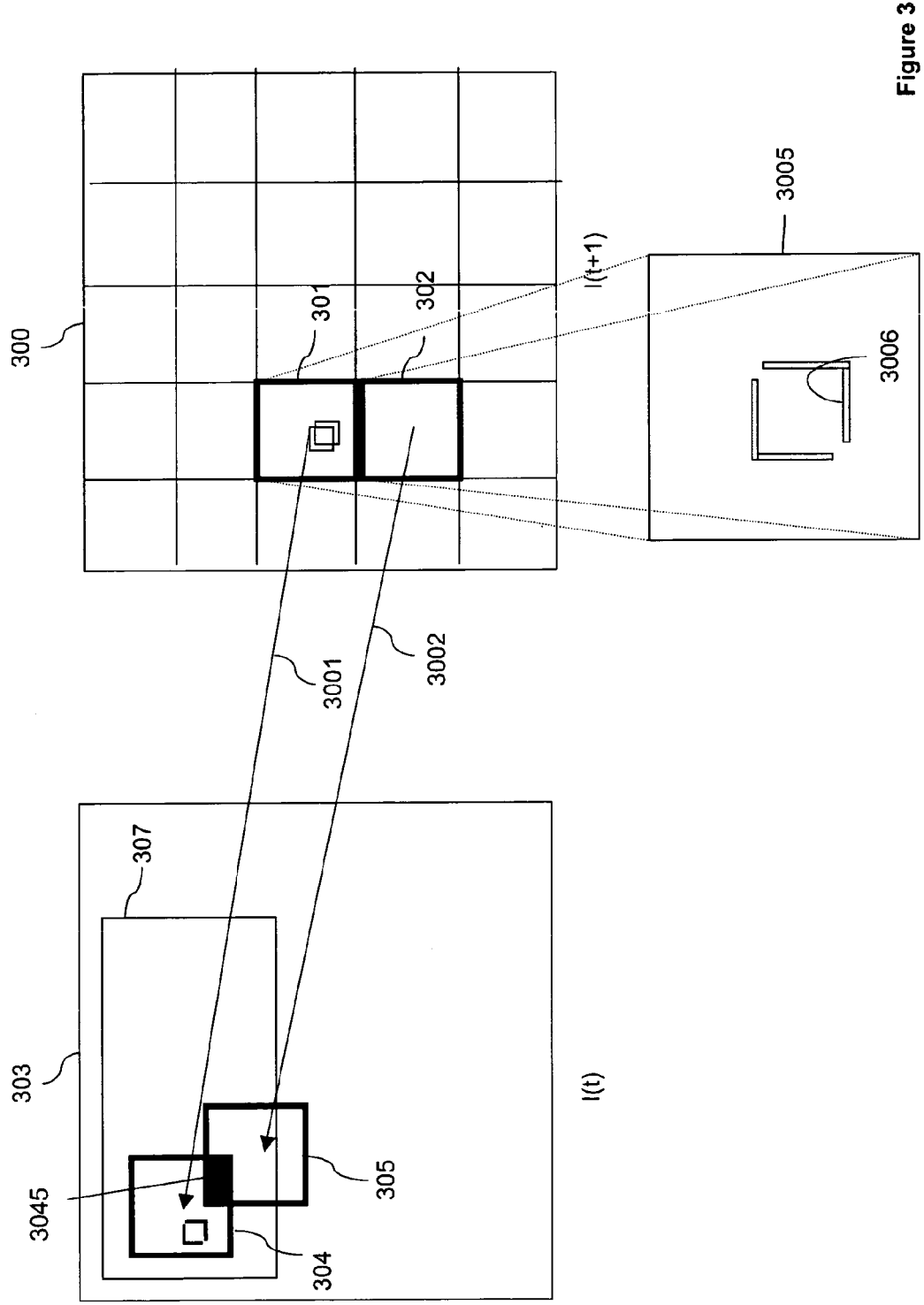
FIG. 3 illustrates schematically the use of residual data according to the invention.

The principle of the use of the residual data is now explained with respect to FIG. 3. The image I(t) 303 has suffered from some loss during transmission for example, affecting area 307. In this example we consider that the image to be processed is an INTRA-type frame, and that the lost area 307 is reconstructed by spatial interpolation. The image I(t) 303 has been used, at the encoder, as a reference image in the prediction of the following predicted image I(t+1) 300. In this example, it is supposed that the image I(t+1) 300 was received without any error at the decoder.

Since I(t+1) is a P-frame, its blocks are encoded by prediction from areas of a reference image. In particular, block 301 was predicted from an area 304 comprised within the lost area 307 of the image I(t). As explained earlier, the residual data corresponding to the difference between the content of block 301 and the content of block 304, transformed by DCT and quantized is received by the decoder. In the figure, the block 301 is represented after dequantization and inverse transformation. Similarly to the example given with respect to FIG. 2b, we consider a block which initially represented a gray square on a white background. As explained above with respect to the FIG. 2b, the residual data encodes a prediction error representative of the edges of the gray square, represented in a magnified version as areas 3006 of block 3005.

Along with the residual data corresponding to the block 301, an associated motion vector 3001, pointing to area 304 of image I(t), is also received. According to the invention, the residual data decoded from the received predicted image I(t+1) can be projected onto the frame I(t), to create residual information related to the area 307 which suffered from data loss or corruption.

The projected residual data obtained by projection from at least one following frame will be used to improve the spatial interpolation process to be applied to reconstruct the texture of the lost area. More generally, the projected residual data can be used to improve any type of error concealment method applied to reconstruct the texture of the lost/corrupted area.

The predicted image I(t+1) contains other blocks which have been predicted from the reference image I(t), some of them corresponding temporally to the area 307 which suffered from data loss or corruption.

For example, for block 302 of the image I(t+1) 300, the residual data is received along with a motion vector 3002 pointing to area labeled 305 in the image I(t) in the example of FIG. 3.

As shown on the figure, the block 305 is partially situated within the area 307 corresponding to the data loss, and also there is a partial overlap (labeled 3045 in the figure) between block 304 corresponding to the projection of block 301 and block 305 corresponding to the projection of block 302.

In this case, according to the preferred embodiment of the invention, the residual information corresponding to the area 3045 is the residual data selected from the block having the highest energy on the considered area 3045 between the two possible candidates 301 or 302. This determination is explained in more detail later.

According to an alternative embodiment, the residual data from the last block processed is used to build the residual information corresponding to the corrupted area 307.

Finally, residual information corresponding to the corrupted area can be obtained from at least one image predicted from the image which suffered data corruption. The residual information is typically equal to zero in the parts of the corrupted area on which no block from the predicted image is projected. As for the parts where several blocks from the predicted image are projected, the overlap is handled as explained above.

Figure 4:
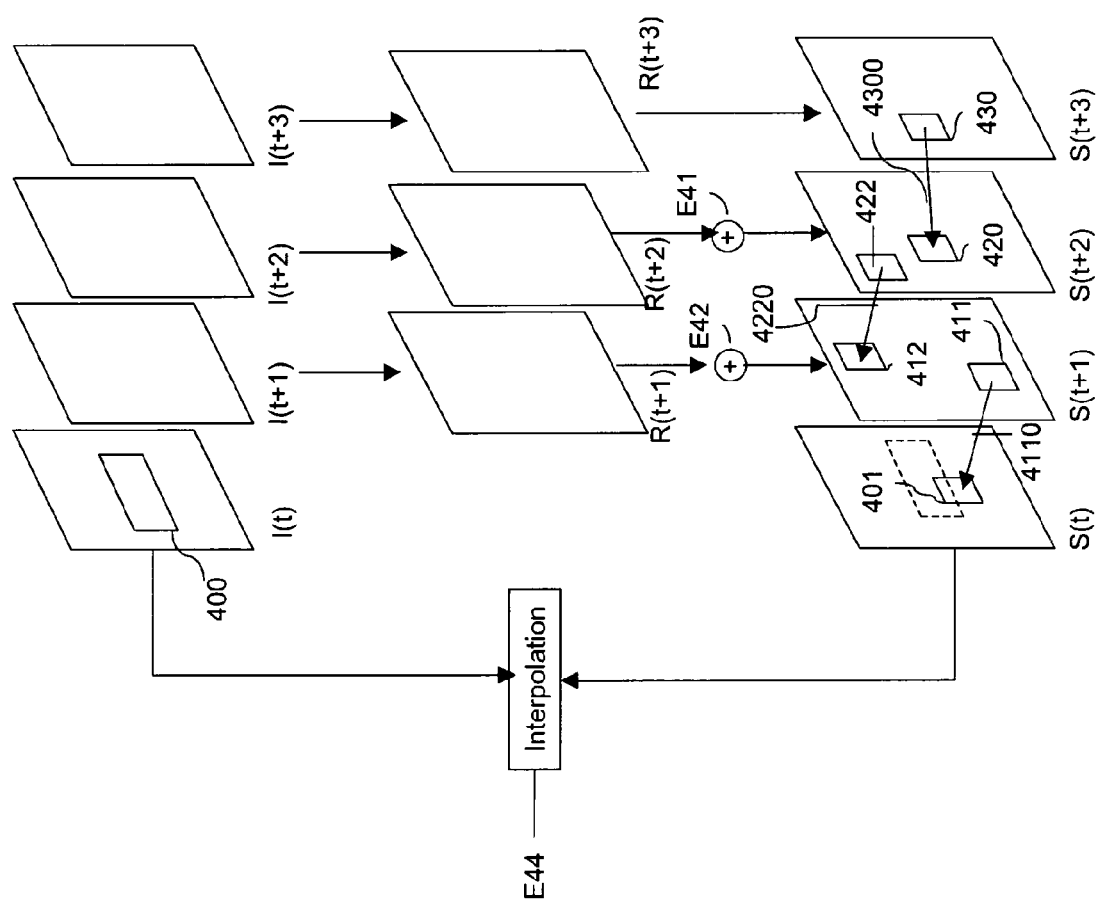
FIG. 4 illustrates schematically the projection of residual data from several following frames according to the invention.

FIG. 4 illustrates how the invention can be implemented in a case where the residual information is gathered from several following predicted images, according to a temporal projection, that is to say a projection according to the motion vectors. In MPEG-type encoding schemes, the images are grouped by groups of pictures (known as GOPs), which have a predetermined prediction structure, starting with an INTRA image, so that a GOP is encoded independently from a previous GOP. For example, in this embodiment, a GOP contains INTRA and predicted frames according to the structure IPPP for a 4 picture GOP. In this example, the first P-frame is predicted from the I-frame, and the second P-frame is predicted from the first P-frame etc. So the first P-frame is at the same time a predicted frame and a reference frame. The second P-frame is directly predicted from the previous P-frame, but indirectly predicted from the I-frame.

More generally, the invention may be applied to GOPs which contain INTRA, predicted and bi-directional frames.

In the example of FIG. 4, the current image considered for processing is image I(t), which has a corrupted area 400, for which some data is unrecoverable. The following images represented in the figure are supposed to be P-frames, which are successively predicted from one another according to the prediction scheme explained above. To simplify, we consider here that for each P-frame, all of its blocks are encoded by prediction. Therefore, each following P-frame is associated in the bitstream with the field of motion vectors associated to its blocks and the corresponding residual data associated with each block. The residual data associated with each P-frame is represented on the figure: R(t+3) represents the residual data corresponding to image I(t+3), R(t+2) represents the residual data corresponding to image I(t+2) and R(t+1) represents the residual data corresponding to image I(t+1).

In one embodiment of the invention, the residual data corresponding to the last frame, which is the most distant in time with respect to the frame I(t) to be reconstructed, is considered as an initial residual information.

A projected residual data image corresponding to the image I(t+3), denoted S(t+3), is set to be equal to residual data R(t+3). A block 430 of S(t+3) is represented on FIG. 4. The block 430 has an associated motion vector 4300 which points to a corresponding area 420 located in the previous image I(t+2).

All the blocks from S(t+3) are projected according to their corresponding motion vectors to initialize the residual data image S(t+2) associated with image I(t+2). Next, the residual data corresponding to image I(t+2), R(t+2) is added (step E41) to the projected residual data to obtain the complete projected residual data image S(t+2) corresponding to image I(t+2).

The same process is repeated to obtain the projected residual data corresponding to the previous image I(t+1) and so on. For example, the block 422 of the projected residual data image S(t+2) is projected according to its motion vector 4220 onto an image S(t+1) representing the projected residual information of image I(t+1). Next, the residual information corresponding to image I(t+1), R(t+1) is added to the projected residual data at step E42 to obtain the final projected residual data image corresponding to image I(t+1).

Next, the residual data image S(t+1) is projected onto a residual data image S(t) corresponding to I(t), according to the motion vectors associated to image I(t+1). For example, the block 411 is projected onto S(t) according to its motion vector 4110 onto area 401. The corrupted area 400 was also represented as a dashed lined area on the image S(t).

Figure 7:
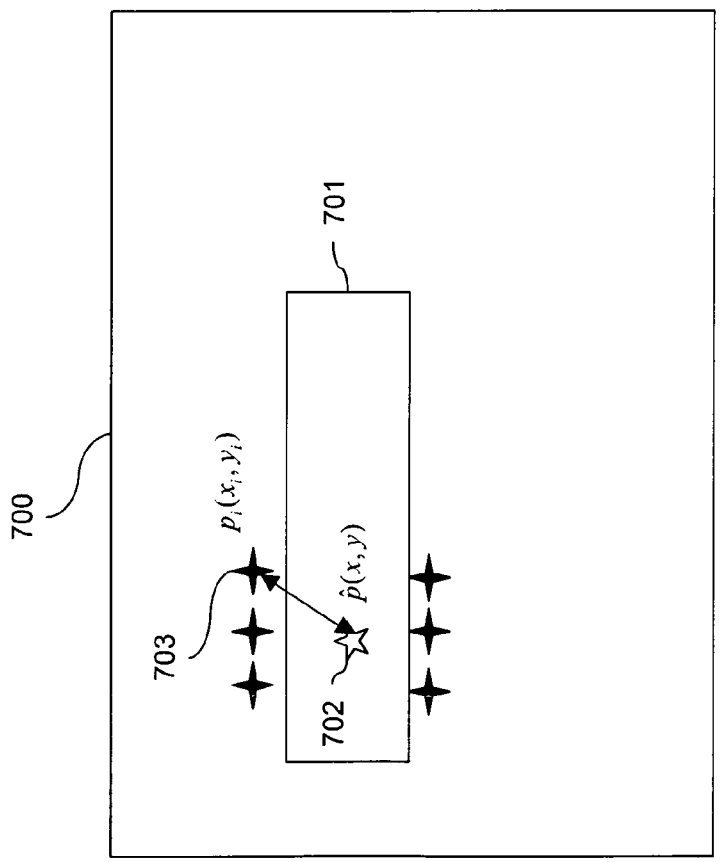
FIG. 7 is a schematic representation of a prior-art spatial interpolation method.
Figure 8:
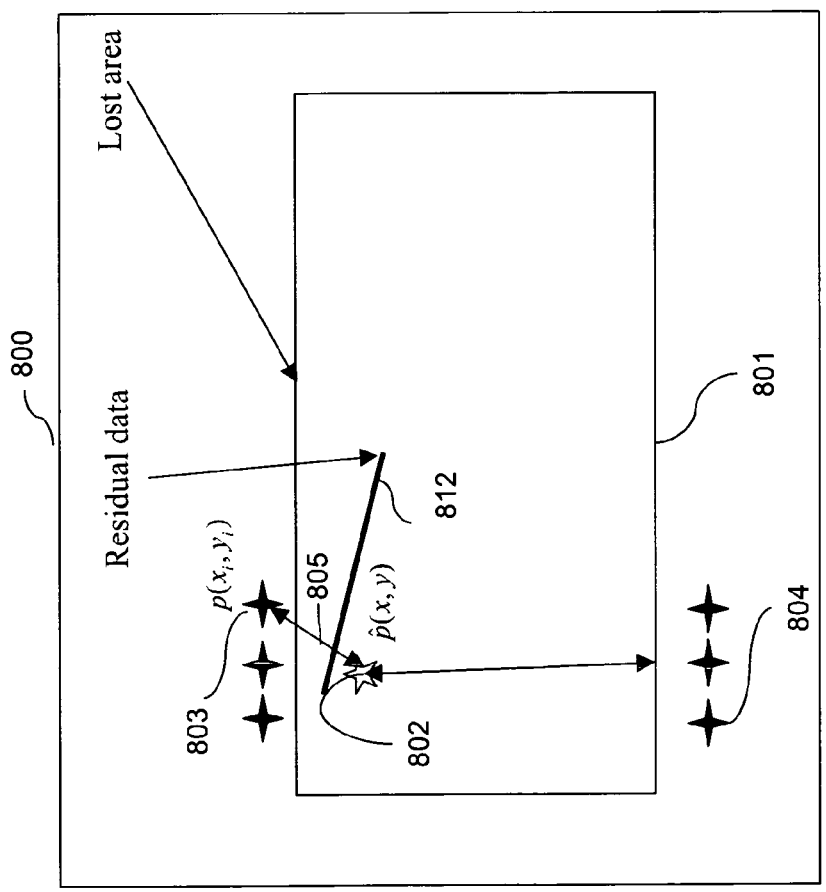
FIG. 8 is a schematic representation of the use of residual data to improve the spatial interpolation according to a first embodiment of the invention.
Figure 9:
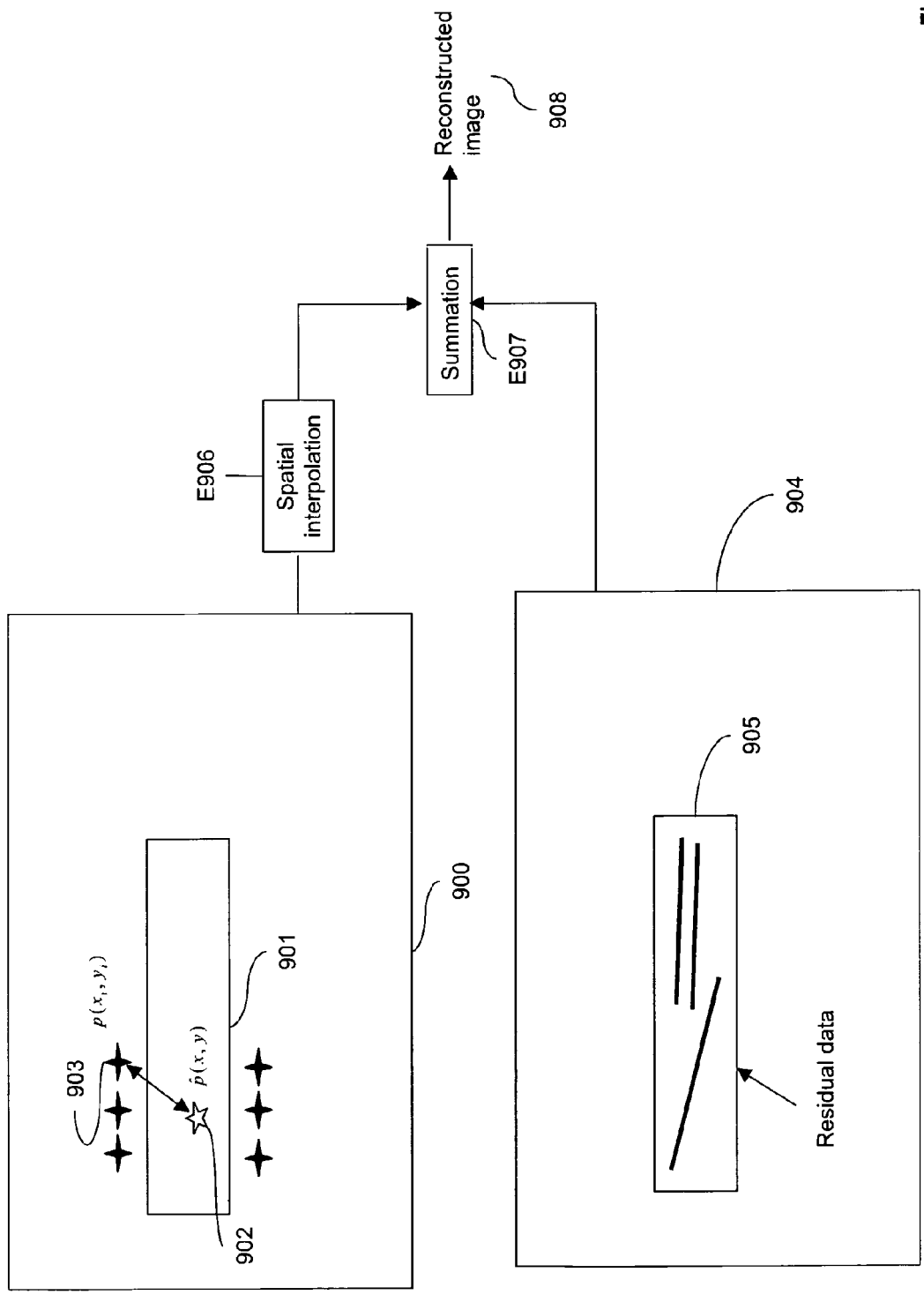
FIG. 9 is a schematic representation of the use of residual data to improve the spatial interpolation according to a second embodiment of the invention.

Finally, an image containing projected residual information from the following 3 frames is obtained in S(t), and this image can be used, in conjunction with the current image I(t), in an error concealment process, such as spatial interpolation E44 in this example, to reconstruct the corrupted area 400 as explained with respect to FIGS. 7 to 9.

The projection of residual data from several following images results in a higher quantity of information on the edge localization of the corrupted or lost area 400.

In the embodiment described above, all the residual data from the considered predicted images is used, and a complete projected residual data image is created for each frame considered.

In an alternative embodiment, only the residual data from the blocks that are finally projected onto the lost area 400 are taken into account.

Figure 5:
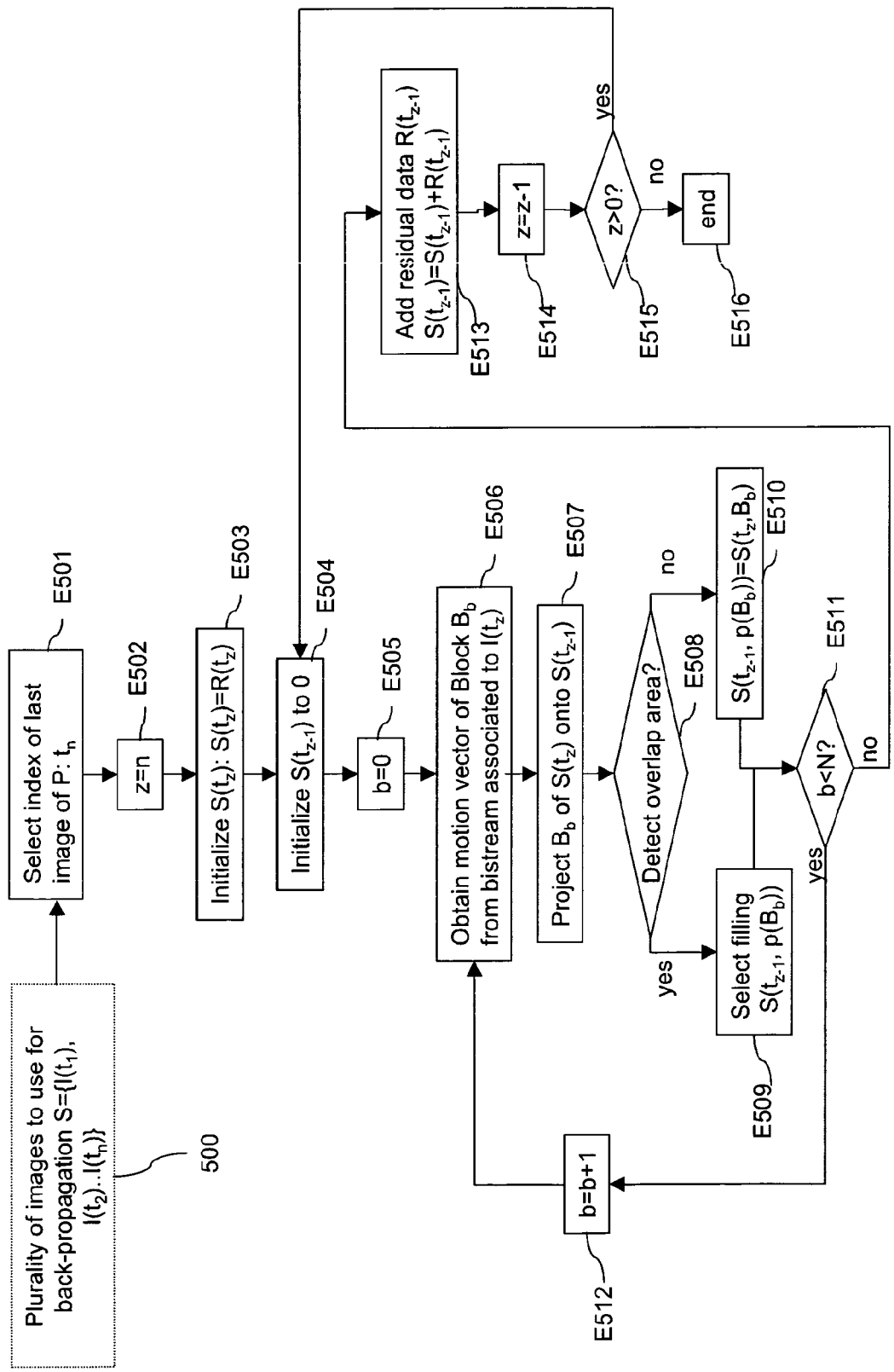
FIG. 5 is a flowchart of an algorithm of residual data projection according to the invention.

The FIG. 5 shows a flowchart of an algorithm for the projection of the residual data, as previously explained schematically with respect to FIGS. 3 and 4. All the steps of the algorithm represented in FIG. 5 can be implemented in software and executed by the central processing unit 1111 of the device 1000.

Firstly, a plurality of images 500 to be used for projection of the residual data is considered: $S=\{I(t_1), \ldots, I(t_n)\}$. The set S contains images of the video sequence, which are predicted from the current frame I(t) (where $t=t_0$), either directly or indirectly. In general, the images of the set S follow each other, that is to say that $t_j=t_{j-1}+\Delta t$, where $\Delta t$ is a predetermined time interval, but this is not necessarily the case.

The first step of the algorithm E501 is the selection of the last image of set S, which is the image at the highest temporal distance from current image I(t₀). The number n of images to be taken into consideration is predetermined, as it will be explained with respect to FIG. 6.

At next step E502 a variable z is initialized to be equal to n.

Next, a residual data image $S(t_z)$, corresponding to image of index $t_z$, is initialized to the value of the decoded residual signal of the image $I(t_z)$ at step E503. Further, a residual data image $S(t_{z-1})$ corresponding to the previous image of the set S, of index $t_{z-1}$, is initialized to 0 in each of its points at step E504. Eventually, an index b is initialized to 0 at step E505.

The block or macroblock of index b, $B_b$, of the predicted image $I(t_z)$ is considered. At step 506 the motion vector related to $B_b$ is decoded from the bitstream or obtained from a storage space of RAM 1112 if it has already been decoded.

At the next step E507, the residual data corresponding to block $B_b$ and stored in image $S(t_z)$ at the spatial localization corresponding to block $B_b$ is projected according to the motion vector onto the residual data image corresponding to image of index $t_{z-1}$, $S(t_{z-1})$. In some implementations, a block may be divided into sub-blocks, and then a motion vector is associated with each sub-block. In such a case, at step E507, several projections according to each motion vector are applied at step E507.

As explained with respect to FIG. 4, in some cases an overlap of several projected blocks onto a spatial area might occur. The presence of an overlap area is tested at next step E508. In practice, for example, it is checked if all pixels of the block onto which the residual data of block $B_b$ is projected are equal to zero. The pixels whose value is not zero define the overlap area.

In case of positive detection of an overlap area, step E508 is followed by step E509. A method to fill the overlap area with projected residual data is applied in step E509. In a preferred embodiment, the data from the block having the highest energy on the overlap area is chosen for projection. The energy can be calculated by the variance of the residual data signal in the block or by the standard deviation of the residual data signal in the block.

In an alternative embodiment, the projected residual data simply replaces the previous residual data. The advantage of this alternative embodiment is that there is no necessity to store anything to carry out the filling in of the overlap area. If this alternative embodiment is chosen, step E508 may be skipped, which increases the processing speed.

The step E509 is followed by step E511.

If no overlap area is detected at step E508, the projected residual data is simply copied onto the temporally corresponding block, denoted $p(B_b)$ (for projection of $B_b$ according to the corresponding motion vector), of the image $S(t_{z-1})$, at step E510, which is then followed by step E511.

At step E511, the block counter b is compared to N, the number of blocks of the predicted image $I(t_z)$ which is processed, to determine if all blocks of the image under consideration have been processed. This number is generally fixed for the entire sequence.

If not all the blocks have been processed, the step E511 is followed by step E512 at which the block counter is increased, and steps E506 to E511 are repeated.

If all blocks have been processed, step E511 is followed by step E513, at which the residual signal corresponding to image $I(t_{z-1})$, is added to the residual data image $S(t_{z-1})$ obtained by projection as explained above, to obtain the final projected residual data image.

Next, the index z is decreased at step E514, and it is checked if z is greater than zero at step E515. If it is the case, it means that there are still predicted images of the set S to be processed, so the process returns to step E504. On the other hand, if the index z reached the value zero, it means that the projected residual data image corresponding to the current image I(t) has been built, and the process stops at step E516.

When the index has reached the value 1, step E513 may be exceptional, since residual data $R(t_0)$ for the current image might not be available (for example if the current image is an INTRA-image), and in particular residual data for the lost area will not be available. In this case, the step E513 might be simply skipped when the index z is equal to 1.

In an alternative embodiment, it is envisaged that the current image is a predicted image and only part of the data corresponding to the current image was correctly received at the decoder. For example, if the encoder uses data partitioning, and the motion field is transmitted separately from the residual data, it may be envisaged that the residual data is correctly received at the decoder, but the motion field, for at least an area of the current image, was lost or corrupted and cannot be accurately decoded. In this case, the area for which the motion field is lost is the area to be reconstructed. However, it is assumed that the residual data corresponding to said area is correctly received and can added to be residual data obtained by projection from the predicted images of the set S.

Figure 6:
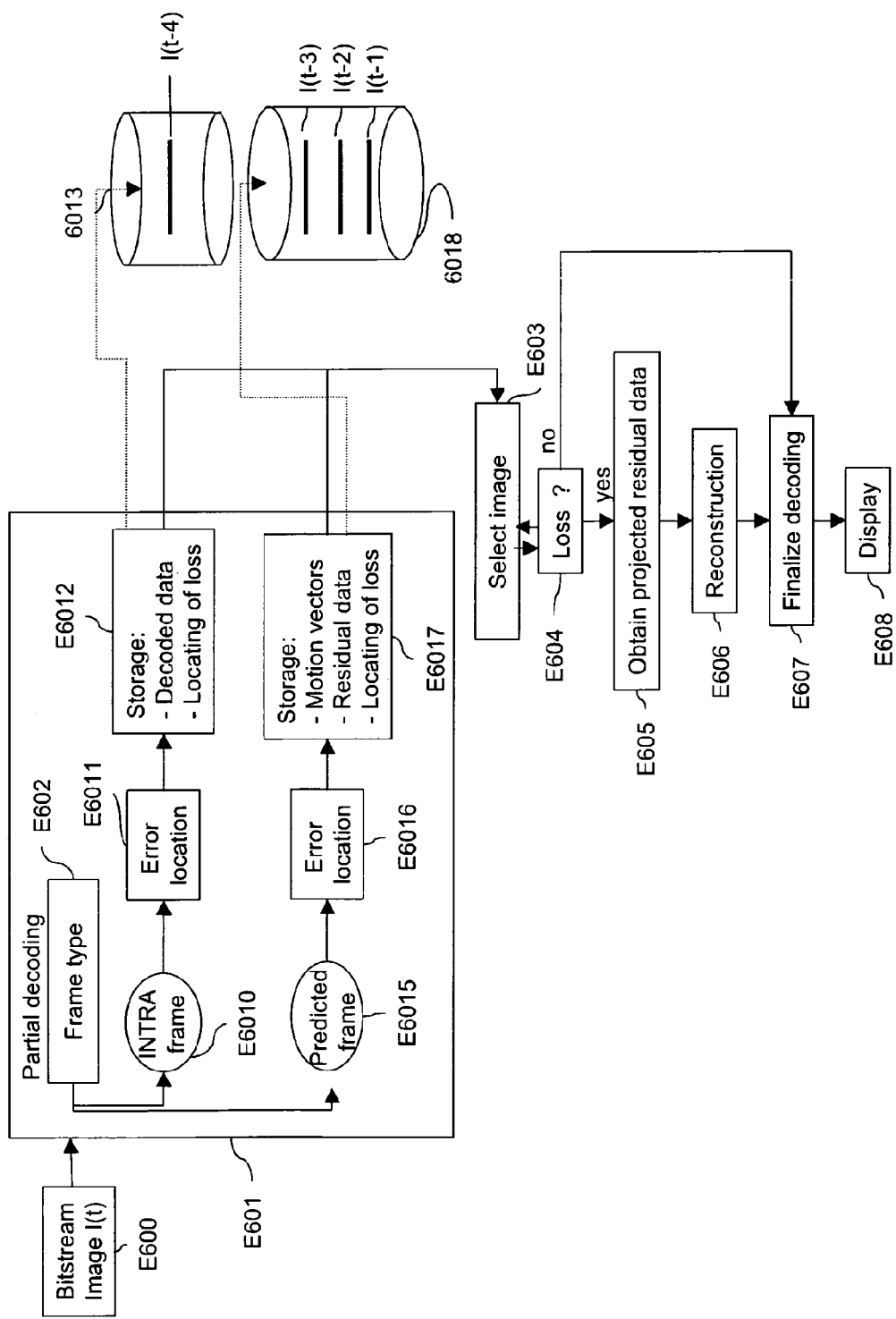
FIG. 6 is a flowchart of an embodiment of a decoding method according to the invention.

FIG. 6 illustrates an embodiment of the decoding method which implements the use of the residual data obtained by projection to reconstruct lost or corrupted areas in the video sequence. All the steps of the algorithm represented in FIG. 6 can be implemented in software and executed by the central processing unit 1111 of the device 1000.

In this figure, the bitstream containing an encoded image I(t) is received at step E600.

Next, the bistream received is partially decoded at step E601, that is to say that all the portions of the received bistream that are not corrupted and can be decoded by the conventional decoding method are decoded.

The decoding step E601 is implemented differently according to the type of received image, INTRA or predicted, which is tested at step E602. The two cases are represented as two branches on the figure.

If the received image I(t) is a INTRA-frame, then the received signal which is not corrupted is decoded (step E6010) by entropic decoding, inverse quantization and inverse transform as explained above, and the areas to be reconstructed which contain some errors that make the received data corrupted are located (step E6011). Both the decoded data, which represents pixel values for non corrupted areas and the localization of the corrupted or lost areas are stored at step E6012 into a memory 6013 of RAM 1112, which contains similar data stored for previously received images (e.g. I(t−4)) which have not yet been fully processed.

If the received image I(t) is a P-frame, then the data received without error with respect to I(t) is decoded (step E6015), such data including a field of motion vectors and corresponding residual data. Further, an error location step E6016 localizes the areas to be reconstructed for which some data is lost, either motion vectors, or residual data or both. The decoded data representing motion vectors and residual data for the correctly received macroblocks is stored at step E6017, along with the localization of the lost areas if there are some, in a memory 6018 of RAM 1112 which contains similar data stored for previously received images (e.g. I(t−3), I(t−2), I(t−1)) which have not yet been fully processed.

An internal clock indicates which image needs to be displayed. In this example of embodiment, the clock indicates that the previously received image of index t−4 that has to be displayed, so the processing delay between reception and display of an image is equal to 4 time intervals. Accordingly, in this embodiment, the number of images n which can be used for the projection of the residual data is equal to 4.

Next, at step E603, the image indicated by the internal clock is selected from the corresponding storage space of the random access memory 1112, memory 6013 in this example since the current image is an INTRA-frame, and becomes the current image to be processed.

The next step E604 checks if a loss has occurred on the current image, i.e. if any information with respect to a localized erroneous area has been previously stored. If no loss has occurred, then step E604 is followed by the step E607 to finalize the decoding of the current image.

If the current image is an INTRA-frame and no loss has occurred, then the data has been fully decoded and stored previously at step E6012, so it can be directly displayed at step E608. In this case, no particular processing is carried out at step E607.

If the current image is of predicted type, and no loss has occurred, then at step E607 the decoded residual signal is combined to the decoded signal of the reference image to obtain the fully decoded data containing the pixel values of the signal to be displayed at the following step E608.

In case a loss was detected and the localization of the lost area(s) has been obtained at step E604, then step E604 is followed by step E605 of obtaining projected residual data, for example according to the embodiment explained with respect to FIG. 5. In this step, projected residual data for the area or areas to be reconstructed is obtained from at least one image predicted from the current image. The residual data of the at least one predicted image corresponding to a temporal projection of the area(s) to be reconstructed is used.

The projected residual data corresponding to the lost areas of the current image is then obtained, and it can be used for reconstruction of the lost data at step E606. The reconstruction of the data of the lost area is achieved by a spatial interpolation method in a preferred embodiment of the invention, as explained with respect to the FIGS. 7 to 9.

Figure 10:
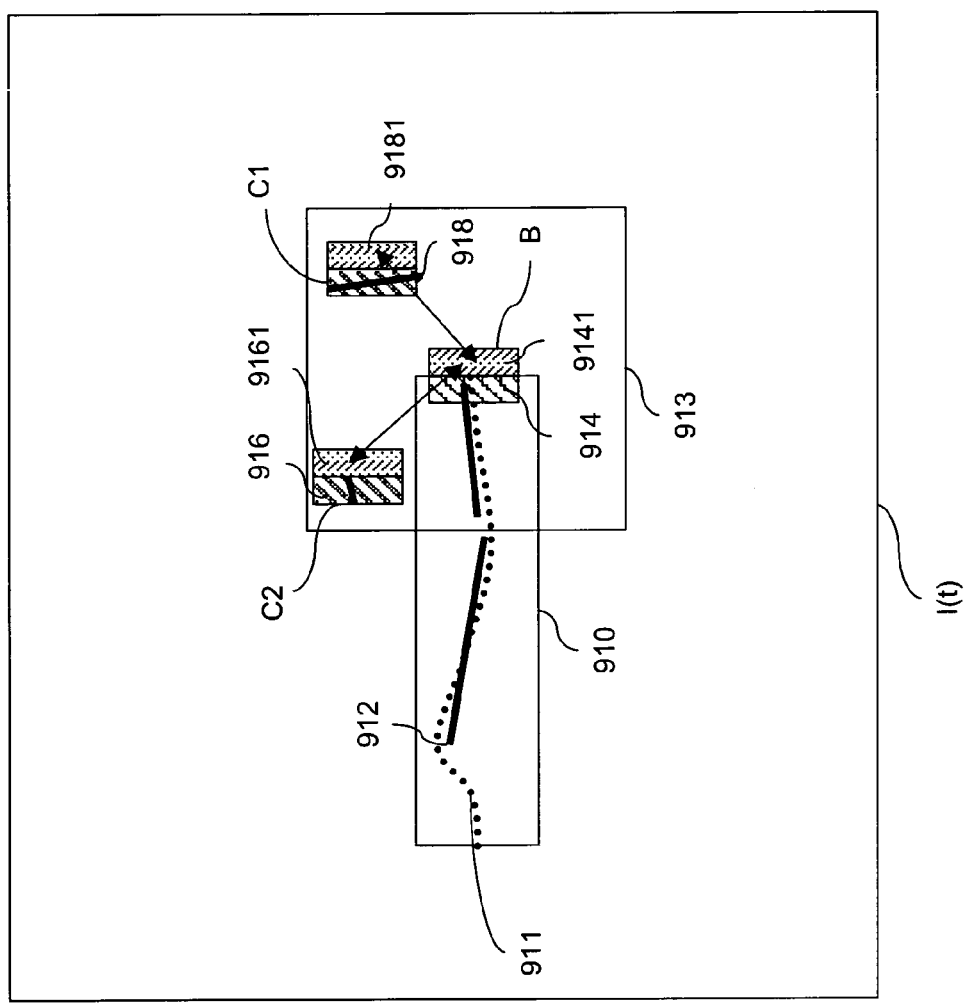
FIG. 10 is a schematic representation of the use of residual data to improve the reconstruction according to a third embodiment of the invention.

Alternatively, the reconstruction may be achieved by another spatial error concealment method, such as a block matching error concealment method as explained with respect to FIG. 10.

The use of the projected residual data to improve reconstruction may be done only on some parts of the lost area, according for example to an energy criterion on the residual data: if a block of the residual data does not carry enough energy, that block of residual data is not used within the interpolation process.

Next, at step E607, the decoding is finalized, as explained above.

Finally, the fully decoded and reconstructed image I(t−4) can be displayed at next step E608. The display step is however optional. It can be envisaged that the number of frames to be taken into account in the residual data projection is predetermined (n=4 in the example given here) and the entire video is decoded and stored for later use.

The reconstructed image obtained after applying step E607 can also be stored in order to be used as a reference image for the prediction of the following P-frames, so as to insure a better quality for the following decoded images.

Next, FIGS. 7, 8 and 9 describe spatial interpolation methods that can be implemented in the reconstruction step E606 of the embodiment of FIG. 6.

FIG. 7 describes schematically a spatial interpolation method used in spatial error concealment methods. On the figure is represented an image 700, which contains a lost or corrupted area 701, for which the pixel values cannot be decoded by the classical decoding method. The value of a pixel 702 of the lost area 701 can be calculated by a weighted sum of pixels values 703 from the neighborhood of the area 701, according to the following formula:

$$\hat{p}(x, y) = \sum_{i \in V(x,y)} w_i p_i(x_i, y_i) \quad (1)$$

where $\hat{p}(x,y)$ represents the estimated value of the signal for pixel 702 situated at coordinates (x,y); $p_i(x_i, y_i)$ is a pixel 703 from a predetermined neighborhood V(x, y), and $w_i$ is a weighting factor. The neighborhood can contain, for example, the set of all pixels which are not part of the lost area 701, and which are within a predetermined distance D from the pixel 702 considered. For example, V(x,y) contains all pixels which are not lost and for which the coordinates are within the bounds $(x_i, y_i) \in \{(x \pm D, y \pm D)\}$.

The weighting factor is chosen as a function of the distance between the considered pixel 702 and the pixel used for interpolation 703, so as to increase the influence, on the final result, of the pixels in the neighborhood that are close and to decrease the influence of the ones that are farther from the considered pixel. Therefore, a formula for the weighting factor may be:

$$w_i = \frac{\frac{1}{d_i(x, y)}}{\sum_{i \in V(x,y)} \frac{1}{d_i(x, y)}} \quad (2)$$

where $d_i(x,y)$ is the distance between pixel 702 at coordinates (x,y) and pixel 703 at coordinates $(x_i, y_i)$. Classically the quadratic distance is used: $d_i(x, y) = \sqrt{(x-x_i)^2 + (y-y_i)^2}$, but other types of distances (sum of absolute values of the coordinate difference for example) can also be used.

As explained earlier, this spatial interpolation method has the effect of a low-pass filtering on the signal, and therefore the reconstructed area can appear blurred, in particular if the lost area is not completely uniform and contains textures and edges.

The FIG. 8 illustrates a first embodiment of the use of the residual information to improve the spatial interpolation method described above according to the invention.

In FIG. 8, an image 800 with a lost area 801 and some pixels on the neighbourhood 803, 804 have been represented. To facilitate the explanation, the projected residual data was also represented within the lost area 801 in the form of a contour 812. In practice, as explained above, the projected residual data is stored separately from the image to be decoded. We suppose that the contour 812 is the projected residual data obtained according to the invention. As explained earlier, the residual data is representative of the edges of the image. In this schematic simplified example, it is supposed that the residual data other than the contour 812 is equal to 0, meaning that the image does not possess any other edge in the considered area.

In this embodiment, the residual data is used to modify the weighting factor associated with each pixel to be used in the interpolation according to formula (1) in the following manner. The modified weighting factor depends on the values of the residual data on a line 805 which joins the pixel to be reconstructed 802 at position (x,y) to the pixel from the neighbourhood 803 at position $(x_i, y_i)$ as well as the distance $d_i$ between pixels 802 and 803.

For example, the following formula to calculate the weighting factor may be used:

$$w_i = \frac{\frac{1}{d_i(x, y) + r_i(x, y)}}{\sum_{i \in V(x,y)} \frac{1}{d_i(x, y) + r_i(x, y)}} \quad (3)$$

where $r_i$ represents a summation of the projected residual data over a line, represented by line 805 on the figure.

$$r_i = \sum_{(p,q) \in Line(x,y,x_i,y_i)} |S(p, q)| \quad (4)$$

where $|S(p,q)|$ is the absolute value of the projected residual data image sample at coordinate (p,q).

Therefore, the high values of residual data have an effect of virtually increasing the distance between the pixel to be reconstructed and the pixel used for interpolation. It is assumed that if there is a contour in the area to be reconstructed, it is most likely that the textures on the each side of the contour are different, so the contour acts as a barrier to stop a pixel from the other side of the barrier from having a large influence on the final reconstructed values.

In an alternative embodiment, for a pixel to be reconstructed, all the pixels in its neighbourhood are used in equation (1), using weighting factors according to equation (3). At the initialization, all the pixel values of the pixels within the considered area 801 are set to zero. Then, once calculated, the reconstructed values further contribute to reconstruct values in the neighbourhood.

FIG. 9 describes another embodiment of the use of the residual data to improve the quality of reconstruction by spatial interpolation.

Image 900 represents an image which contains a lost area to be reconstructed, 901. The pixel 902 is one of the pixels for which the spatial interpolation error correction process will attribute a value, using some neighbourhood pixels as 903.

The projected residual data image corresponding to the image 900 is also represented as image 904, and the area corresponding to the lost area 901 is the area 905, which contains some residual data representative of the image contours. In an alternative embodiment, only the residual data corresponding to the lost area (area 905) is stored in memory, for example in a storage space of the RAM 1112, so as to minimize the storage space necessary for storing the residual data.

In this embodiment, in a step E906 the spatial interpolation explained with respect to FIG. 7 is applied to all pixels 902 of the area 901 of image 900.

Next, the projected residual data corresponding to the lost area is added to the interpolated data, for each pixel of the area 901, at step 907. If a resulting value after addition is higher than the maximum allowed pixel value (typically, 255) or lower than the minimum pixel value (typically, 0), the value is set to the corresponding maximum or minimum value.

Finally, for all pixels of a lost area, a reconstructed image 908 is obtained.

As previously explained, since the residual data contains high frequency information, by adding it to the reconstructed pixel values, the high frequency areas are enhanced.

FIG. 10 illustrates another embodiment of the invention, in which the residual data available is used to improve a different method of spatial error concealment, based on block-matching.

In this example, it is supposed that area 910 of image I(t) is corrupted or lost and needs to be reconstructed. To achieve the reconstruction, the blocks of the area are successively processed, starting for example with the blocks close to the border. For example, block 914 is considered. The block-matching method consists in searching, in a predetermined search area 913, for a block that has the highest likelihood to resemble the lost block 914. In order to find such a block, the data that was received and decoded in the rest of the image can be used. A portion 9141 which is adjacent to the block 914 to be reconstructed, but for which the decoded values are available is considered. Blocks 914 and 9141 form a block B. It is then possible to apply block matching to search for the block best matching the block 9141 in terms of luminance content. In a typical embodiment, the distance used is the mean square difference, and the block minimizing this distance is chosen as a candidate for reconstruction of the lost block.

For example, block 9181 of FIG. 10 is found as being the closest to block 9141, and block 9161 is the second closest one. In this case, a classical algorithm would replace block 914 with block 918, assuming by hypothesis that if blocks 9141 and 9181 are similar, it is equally the case for the blocks in their neighborhood. This assumption may however be wrong, since area C1 (composed of block 918 and 9181) may not be related to area B by a simple translation.

In order to illustrate a possible embodiment of the invention, FIG. 10 shows an underlying edge 911 of the area 910, and also projected residual data 912 gathered for the area 910 according to the invention. Further, residual data containing edge information related to areas C1 (composed of block 918 and block 9181) and C2 (composed of block 916 and 9161) is also represented.

Using the residual information available it is possible to improve the reconstruction of the lost block 914, since the residual data can help choosing the block among the two possible candidates 916 and 918 which is closer to block 914 in terms of edge content.

In the embodiment of FIG. 5, residual data obtained by projection from at least one following frame is available for the entire image, and not only for the area 910 containing lost or corrupted data to be reconstructed. In this case, it is possible to calculate a distance between the residual data corresponding to block 914 and respectively to blocks 916 and 918, and to choose, among the two candidate blocks, the one that minimizes such a distance. In a preferred embodiment, the distance between residual blocks is calculated as the sum of absolute differences between the values of the residual data for each pixel in the block considered. Alternatively, the mean square difference could be also used. In the example of FIG. 10, block 916 would be chosen, since its residual data is closer to the residual data related to block 914.

In a variant, only residual data related to the lost or corrupted area 910 is available, the rest of the image I(t) being correctly received and decoded. In this embodiment, firstly an edge content of each of the blocks 916 and 918 should be estimated, for example by applying a gradient calculation or an edge detection algorithm on the concerned blocks. Finally, after a corresponding edge information block is obtained for each block, a distance between the residual data block 914 and each of the edge information blocks can be applied again, to decide which one of the two candidates is closer in terms of edge contents. It may necessary to normalize the residual data block to have the same range as the edge information block.

In both variants, the residual data is used to choose between two candidate blocks for reconstruction, both candidates being considered close from the luminance pixel values available in the neighborhood, so as to improve the final quality in terms of edge contents.

Note that in the example of FIG. 10, the predetermined search area 913 is an area of the current image. In an alternative embodiment, the search area may be chosen in a previously decoded image. In yet another alternative embodiment, the candidate block for the block matching may be chosen either in the current image or in one or several previously decoded images, so that the search area is distributed among several images.

The invention claimed is:

1. A method for decoding a video sequence encoded according to a predictive format, the video sequence including predicted images containing encoded residual data representing differences between the respective predicted image and a respective reference image in the video sequence, the method applied to a current image which contains at least one area which is to be reconstructed due to loss or corruption of data corresponding to the at least one area of the current image, comprising:
    obtaining projected residual data for said at least one area to be reconstructed from residual data of at least one image which is predicted from the current image and is temporally later in the video sequence than the current image, the projected residual data corresponding to a temporal projection of at least part of the at least one area to be reconstructed onto said at least one image predicted from the current image; and
    reconstructing at least part of said at least one area to be reconstructed using the projected residual data obtained.

2. The method according to claim 1, further comprising, before obtaining projected residual data, locating the at least one area in the current image.

3. The method according to claim 1, wherein, for each block of said predicted image, obtaining residual data comprises:
- obtaining at least one motion vector associated with said block;
- applying at least a projection of the residual data associated with said block, according to said at least one motion vector, to obtain a projected residual data image corresponding temporally to an image which served as a reference image for predicting said predicted image.

4. The method according to claim 3, comprising detecting an overlap area in the projected residual data image, said overlap area being an area to which several blocks of the predicted image are projected.

5. The method according to claim 4, further comprising, after the detecting, selecting to fill the overlap area with the residual data of the projected block having the highest energy.

6. The method according to claim 1, wherein a plurality of predicted images are used in obtaining projected residual data.

7. The method according to claim 6, wherein, for at least one predicted image which is also a reference image for another image of the plurality of predicted images, obtaining projected residual data also comprises adding the residual data of said predicted image to the projected residual data image obtained by temporal projection for said predicted image as reference image.

8. The method according to claim 1, wherein in the reconstructing, decoded data of the current image is also used.

9. The method according to claim 8, the decoded data being decoded values of the pixels of the current image, wherein the reconstructing implements a spatial interpolation algorithm from the decoded values of the pixels within a spatial neighborhood of the at least one area to be reconstructed.

10. The method according to claim 9, wherein, for each pixel to be reconstructed of the at least one area to be reconstructed, the value of the projected residual data corresponding to said pixel to be reconstructed is added to the value obtained by spatial interpolation.

11. The method according to claim 9, wherein the value attributed to a pixel to be reconstructed in the said at least one area to be reconstructed is calculated by a weighted sum of decoded values for pixels in the neighborhood and wherein each weighting factor depends on the projected residual data corresponding to said at least one area to be reconstructed.

12. The method according to claim 11, wherein the weighting factor associated with a pixel in the neighborhood is a function of the sum of absolute values of projected residual data of pixels situated on a line joining said pixel to be reconstructed and said pixel in the neighborhood.

13. The method according to claim 12, wherein said weighting factor is inversely proportional to said sum.

14. The method according to claim 1, wherein the reconstructing implements a block matching error concealment method, the projected residual data obtained for said at least one area to be reconstructed being used to choose between a plurality of candidate blocks.

15. A device for decoding a video sequence encoded according to a predictive format, the video sequence including predicted images containing encoded residual data representing differences between the respective predicted image and a respective reference image in the video sequence, the device comprising:
- a processor; and
- a non-transitory computer-readable storage medium storing a program which, when executed by the processor, causes the device to carry out a method comprising:
  obtaining projected residual data for at least one area of a current image to be reconstructed due to loss or corruption of data corresponding to the at least one area of the current image, the projected residual data being obtained from residual data of at least one image which is predicted from the current image and is temporally later in the video sequence than the current image, and the projected residual data corresponding to a temporal projection of at least part of the at least one area to be reconstructed onto said at least one image predicted from the current image; and
  reconstructing at least part of said at least one area to be reconstructed using the projected residual data obtained.

16. A non-transitory computer-readable storage medium storing a program which, when executed by a computer or a processor in a device for decoding a video sequence, causes the device to carry out a method for decoding a video sequence encoded according to a predictive format, the video sequence including predicted images containing encoded residual data representing differences between the respective predicted image and a respective reference image in the video sequence, the method, applied to a current image which contains at least one area which is to be reconstructed due to loss or corruption of data corresponding to the at least one area of the current image, comprising:
  obtaining projected residual data for said at least one area to be reconstructed from residual data of at least one image which is predicted from the current image and is temporally later in the video sequence than the current image, the projected residual data corresponding to a temporal projection of at least part of the at least one area to be reconstructed onto said at least one image predicted from the current image; and
  reconstructing at least part of said at least one area to be reconstructed using the projected residual data obtained.

* * * * *